Feb. 13, 1951　　　J. L. MATHER ET AL　　　2,541,262
DIE AND TAP HOLDER
Filed June 9, 1950　　　　　　　　　　2 Sheets-Sheet 1
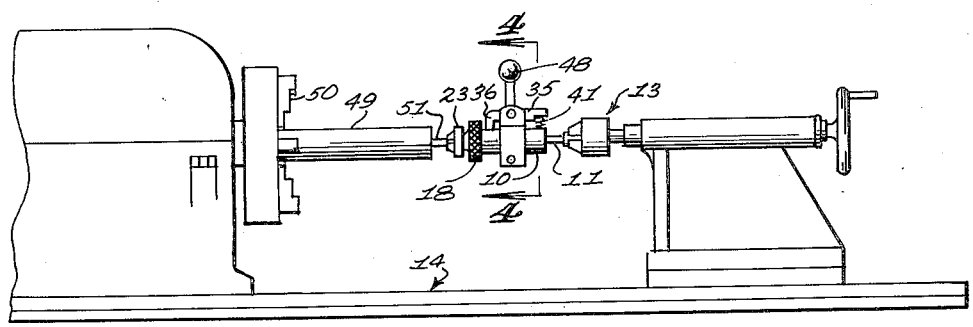
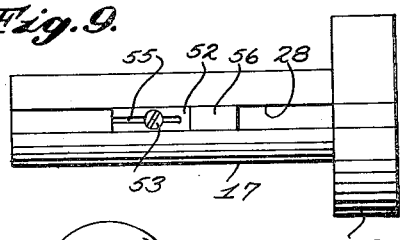
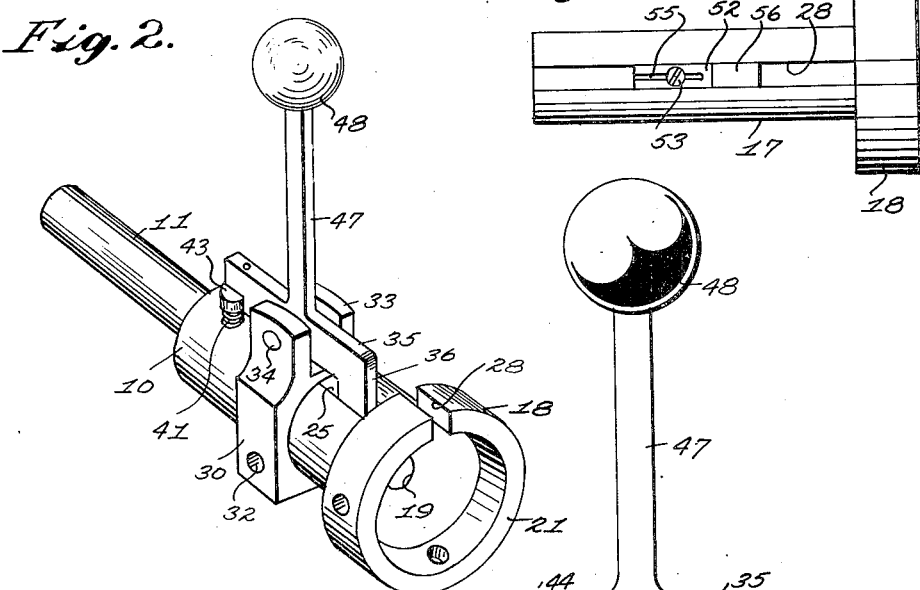
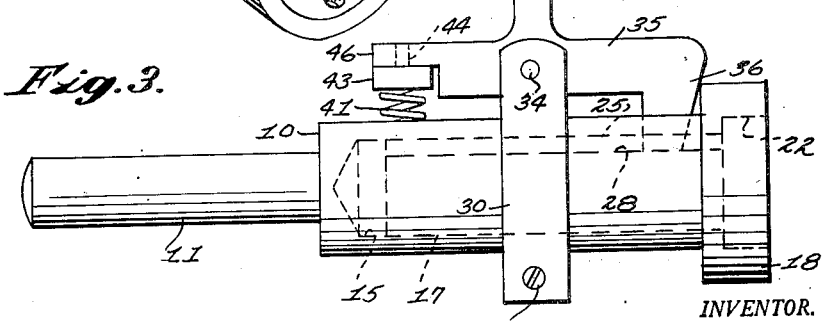
INVENTOR.
JACOB L. MATHER
BY TULLY B. ROBB
McMorrow, Berman + Davidson
ATTORNEYS Feb. 13, 1951 J. L. MATHER ET AL 2,541,262
DIE AND TAP HOLDER
Filed June 9, 1950 2 Sheets-Sheet 2
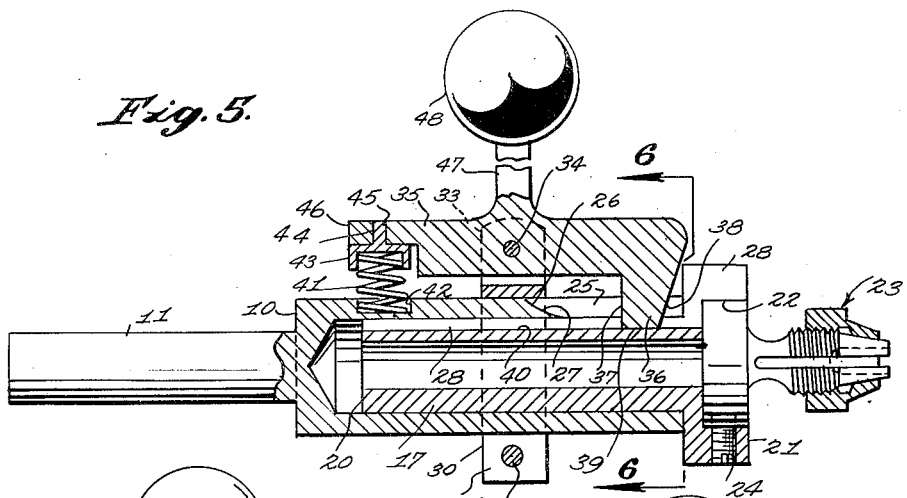
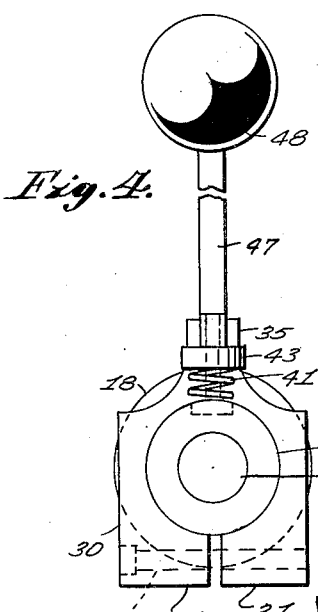
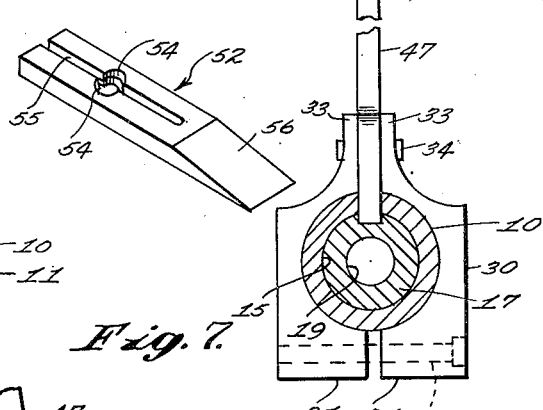
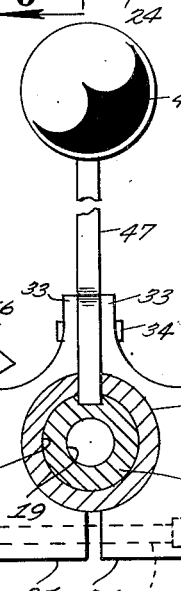
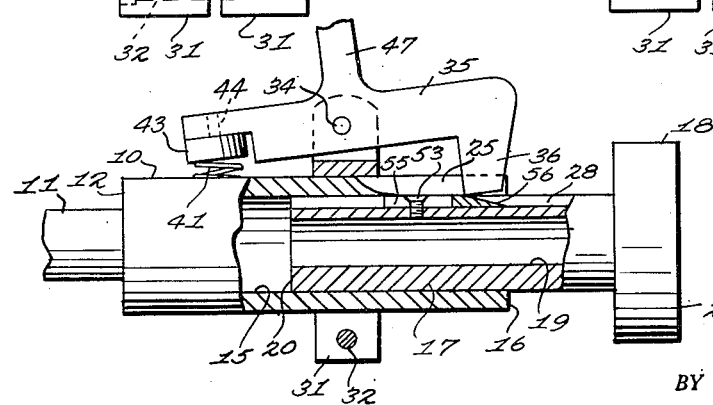
INVENTOR.
JACOB L. MATHER
BY TULLY B. ROBB
McMorrow, Berman & Davidson
ATTORNEYS Patented Feb. 13, 1951

2,541,262

UNITED STATES PATENT OFFICE 2,541,262

DIE AND TAP HOLDER

Jacob L. Mather and Tully B. Robb,
Louisville, Ky.

Application June 9, 1950, Serial No. 167,034

2 Claims. (Cl. 10—89)

This invention relates to an improved die and tap holder for use with lathes for threading and other related operations, the primary object of the invention being to provide a more practical and efficient device of this character which centers the work more accurately, can be started and stopped more accurately in order to define thread lengths, and whose precision of operation is limited only by the quality of the dies and taps used and the condition of the lathe with which the device is used.

Another important object of the invention is to provide a device of the character indicated above which is adapted for use with any type of lathe, is quick and simple in operation, is easily changeable from one size to another or from die work to tapping, and enables an unskilled operator to work to close tolerances and make unlimited duplications.

A further important object of the invention is the provision of a device of the above indicated character having simple, quick-acting release mechanism which enables operation of a die or tap to be instantly stopped to permit accurate cutting to a shoulder, the action of the release mechanism being determined either manually or automatically by mechanical means.

Other important objects and advantageous features of the invention will be apparent from the following description and the accompanying drawings, wherein, merely for purposes of illustration, a specific embodiment of the invention is set forth in detail.

In the drawings, wherein like numerals designate like parts throughout the several views:

Figure 1 is a general side elevation showing the illustrated floating die and tap holder mounted in a lathe, Figure 2 is an enlarged perspective view of the holder, Figure 3 is a side elevation of Figure 2, Figure 4 is a left hand end elevation, Figure 5 is a vertical longitudinal section, showing a tap holder in position, Figure 6 is a transverse vertical section, taken on the line 6—6 of Figure 5, Figure 7 is a side elevation of the holder, partly broken away to show internal structure, and showing the release lever released by a wedge, Figure 8 is an enlarged perspective view of the wedge, and Figure 9 is a top plan view of the inner barrel showing a position of the wedge therein.

Referring in detail to the drawings, the illustrated device comprises an outer plain cylindrical barrel 10 having an axial tang 11 extending from its rearward end 12 for insertion in the tailstock 13 of the lathe 14. It will be understood that the invention contemplates any suitable means for accurately and securely holding the outer barrel 10 in the lathe tailstock 13. The outer barrel 10 has a smooth concentric bore 15 opening through its forward end 16.

The inner barrel 17 is plain tubular cylindrical in form and slides and turns freely in the bore 15 of the outer barrel 10 without appreciable play, the length of the inner barrel 17 being determined by the length of the outer barrel 10. An enlarged head or shoulder 18 is turned on the forward end of the inner barrel 17 to seat flush with the forward end 16 of the outer barrel 10 with the inner barrel 17 in its extreme rearward position, shown in Figure 5. The inner barrel 17 has an axial bore 19 opening through its rearward and forward ends 20 and 21, respectively, which permits the work (not shown) to enter as it is being threaded in a die operation. The forward end 21 of the inner barrel 17 is counterbored, as indicated at 22, to provide a receiver for a die (not shown) or a tap holder 23, as shown in Figure 5. A set screw 24 threaded radially through the shoulder or head 18 engages the die or tap holder to hold the same removably in place.

The outer barrel 10 is formed with a longitudinal slot 25 extending from an intermediate point 26 through its forward end 16. The rearward end of the slot 25 is angulated as indicated at 27. The inner barrel 17 is formed with a longitudinal slot 28, of the same width as the slot 25, extending the entire length of the inner barrel and opening through its rearward and forward ends 20 and 21, respectively, and the head 18. These slots are registered for reception of a portion on the lever of the release mechanism, whereby the inner and outer barrels are secured against relative rotation.

The release mechanism comprises a split pivot block 30 having arms 31 formed to conformably embrace opposite sides of the outer barrel 10 midway between its ends, the arms 31 being clamped on the barrel 10 by a clamping screw 32 passing therethrough, as indicated in dotted lines in Figures 4 and 6. Ears 33 rise from the block 30 at opposite sides of the slot 25 in the outer barrel 10 and are flush with the opposite sides of the slot 25. A pivot 34 traverses the ears 33 and extends therebetween and passes through the midpoint of a flat bar lever 35 which is thereby rockably supported away from the adjacent side of the barrel 10. The forward end of the lever 35 has an inwardly projecting nose 36 having a right angular rearward edge 37 and a rearwardly and downwardly tapered forward edge 38 and a straight plane inward end 39. As shown in Figure 5, the normal position of the lever 35 is parallel with the outer barrel 10, with the nose 36 projecting through the slots 25 and 28, of the outer and inner barrels, respectively, with the plane inner end 39 of the nose 36 flush with and slidably bearing upon the bottom 40 of the inner barrel slot 28. The lever 35 is yieldably maintained in this normal position by an expanding helical spring 41 having one end seated in a circular recess 42 formed in the side of the outer barrel 10 and its other end seated in a cup-shaped retainer 43 having a stud 44 inserted in a hole 45 formed through a reduced rear end portion 46 of the lever 35. From the midpoint of the lever there projects outwardly at right angles an arm 47 terminating in a ball handle 48.

The work, such as the piece 49, to be threaded or tapped, is held in the headstock 50 of the lathe 14 and is turned thereby for either operation. Figure 1 shows the workpiece 49 engaged by a tap 51 secured in a tap holder 23. As the headstock 50 turns and rotates the workpiece 49, the tap 51 (or die) in cutting into the workpiece 49 feeds itself forwardly in the workpiece 49 thereby causing the inner barrel 17 to move forwardly in the outer barrel 10. Whenever the desired length of cut has been made the operator can instantly stop any further cutting by swinging the lever 35 outwardly by means of the handle 48. This withdraws the lever nose 36 from the slots 25 and 28 of the outer and inner barrels 10 and 17, respectively, and permits the inner barrel 17, which carries the tap or die, to turn freely with the workpiece 49, relative to the outer barrel 10. Release of the handle 48 enables the spring 41 to re-engage the lever nose 36 with the slots 25 and 28 and reconnects the rotating inner barrel 17 with the stationary outer barrel 10 to resume cutting or to start a new cutting operation. By reversing the motor driving the headstock 50, release of the handle 48 enables the spring 41 to reengage the lever nose 36 with slots 25 and 28 and reconnects the rotating inner barrel 17 with the outer stationary barrel 10, causing the tap to be withdrawn from the work and making it ready to start a new cutting or threading operation.

Where it is desired that the inner barrel 17 be disconnected from the outer barrel 10 automatically at the end of the predetermined length of cut, a wedge 52, of the same width as the inner barrel slot 28, is placed at a predetermined point in the slot 28 and secured in place by a screw 53, threaded in the slot bottom 40, which passes through openings 54 provided in opposite sides of an expander slot 55, opening through one end of the wedge 52, as shown in Figures 7 and 8. The cam face or ramp 56 of the wedge faces forwardly so that when the inner barrel 17 has been moved forwardly, in a cutting operation in the manner described above, to the desired stopping point, the wedge face 56 cams the release lever nose 36 upwardly out of the inner barrel slot 28, and permits the inner barrel 17 to rotate relative to the outer barrel 10 and instantly discontinues the cutting operation. The wedge 52 can be accurately set along the slot 28 and when so set, duplications of the cut determined by the position of the wedge 52 are accurately and reliably obtained without the supervision of a skilled operator.

What is claimed is:

1. In a holder of the character described, an outer relatively stationary barrel having means on its rearward end for mounting said outer barrel axially in the tailstock of a lathe, said outer barrel having a smooth bore opening through its forward end, an inner tubular barrel inserted in the bore of said outer barrel to turn and slide freely relative to said outer barrel, an axial enlarged head on the forward end of said inner barrel positioned forwardly of the forward end of said outer barrel, said axial head having means for securing a die or a tap holder thereto, a first longitudinal slot formed in said outer barrel and opening through its forward end, a second longitudinal slot formed in said inner barrel and opening through the rearward and forward ends of said inner barrel and through said head, a release lever extending along said outer barrel, means pivoting said release lever intermediate its ends on said outer barrel whereby said lever can be rocked in opposite directions toward and away from said outer barrel, an inwardly projecting nose on the forward end of said lever extending through said first slot and normally extending into said second slot whereby said inner barrel is prevented from rotating relative to said outer barrel while being free to slide longitudinally relative to said outer barrel, spring means operating between said outer barrel and the rearward end of said release lever yieldably holding said release lever in a forwardly rocked position in which said nose extends through said first and second slots, and operating means for rocking said release lever rearwardly to withdraw said nose from said second slot to permit said inner barrel to be rotated relative to said outer barrel, said operating means comprising a wedge secured in said second slot in said inner barrel having a wedge face on its forward end arranged to be engaged by the release lever nose as said inner barrel is moved forwardly relative to said outer barrel in a threading or tapping operation whereby said lever is rocked rearwardly and the release lever nose is withdrawn from said second slot in the inner barrel.

2. In a holder of the character described, an outer relatively stationary barrel having means on its rearward end for mounting said outer barrel axially in the tailstock of a lathe, said outer barrel having a smooth bore opening through its forward end, an inner tubular barrel inserted in the bore of said outer barrel to turn and slide freely relative to said outer barrel, an axial enlarged head on the forward end of said inner barrel positioned forwardly of the forward end of said outer barrel, said axial head having means for securing a die or a tap holder thereto, a first longitudinal slot formed in said outer barrel and opening through its forward end, a second longitudinal slot formed in said inner barrel and opening through the rearward and downward ends of said inner barrel and through said head, a release lever extending along said outer barrel, means pivoting said release lever intermediate its ends on said outer barrel whereby said lever can be rocked in opposite directions toward and away from said outer barrel, an inwardly projecting nose on the forward end of said lever extending through said first slot and normally extending into said second slot whereby said inner barrel is prevented from rotating relative to said outer barrel while being free to slide longitudinally relative to said outer barrel, spring means operating between said outer barrel and the rearward end of said release lever yieldably holding said release lever in a forwardly rocked position in which said nose extends through said first and second slots, and operating means for rocking said release lever rearwardly to withdraw said nose from said second slot to permit said inner barrel to be rotated relative to said outer barrel, said operating means comprising a wedge secured in said second slot in said inner barrel having a wedge face on its forward end arranged to be engaged by the release lever nose as said inner barrel is moved forwardly relative to said outer barrel in a threading or tapping operation whereby said lever is rocked rearwardly and the release lever nose is withdrawn from said second slot in the inner barrel, means securing said wedge at a selected point along said second slot whereby the length of cut by a die or tap secured on said head can be predetermined.

JACOB L. MATHER.
TULLY B. ROBB.

REFERENCES CITED

The following references are of record in the file of this patent:

UNITED STATES PATENTS

| Number | Name | Date |
| --- | --- | --- |
| 634,269 | Nicklin | Oct. 3, 1899 |
| 965,461 | Holland | July 26, 1910 |
| 1,212,966 | Leopold | Jan. 16, 1917 |